United States Patent

[11] 3,527,154

| [72] | Inventors | Charles H. Shaper<br>Houston, Tex.;<br>Milton W. Lowe; John E. Germann,<br>Houston, Tex. |
|---|---|---|
| [21] | Appl. No. | 680,690 |
| [22] | Filed | Nov. 6, 1967 |
| [45] | Patented | Sept. 8, 1970 |
| [73] | Assignee | Char-O Corporation<br>Houston, Tex.,<br>a corporation of Texas |

[54] ELECTRIC GRILL
3 Claims, 5 Drawing Figs.

[52] U.S. Cl. ................................................. 99/400,
99/446; 219/463
[51] Int. Cl. .................................................... A47j 37/07
[50] Field of Search ....................................... 219/455,
458, 463, 467, 347, 348, 349, 524, 465; 99/385,
400, 425, 444, 446, 450, 339, 401, 375, 447

[56] References Cited
UNITED STATES PATENTS

| 3,174,863 | 3/1965 | Shoup | 99/385X |
|---|---|---|---|
| 3,490,359 | 1/1970 | Seitz | 99/400 |
| 2,258,144 | 10/1941 | Parr et al. | 219/405X |
| 2,266,100 | 12/1941 | Uhlrig | 219/415X |
| 3,031,948 | 5/1962 | Lotter | 99/400X |
| 3,208,808 | 9/1965 | Knapp | 99/390X |
| 2,215,929 | 9/1940 | Husk | 99/407X |
| 2,236,992 | 4/1941 | Broadley | 99/446 |
| 2,812,706 | 11/1957 | Del Francia et al. | 99/446 |
| 2,949,525 | 8/1960 | Dunn | 99/339X |
| 3,023,298 | 2/1962 | Wells | 99/446(UX) |
| 3,086,449 | 4/1963 | Cahill | 99/446 |
| 3,166,006 | 1/1965 | Lennox | 99/446 |
| 3,248,518 | 4/1966 | Ogle et al. | 99/446 |
| 3,252,407 | 5/1966 | Buerki | 99/385(UX) |
| 3,254,591 | 6/1966 | Cohen et al. | 99/446X |

*Primary Examiner*—Billy J. Wilhite
*Attorney*—Pravel, Wilson & Matthews

ABSTRACT: This specification discloses an electric barbecue grill including a housing having a cooking grid, a unitized electric heating coil and control switch and a reflecting grease catching tray mounted therein which are readily removable therefrom; the components are so arranged that a portion of the drippings from heat being cooked is vaporized to smoke which provides the barbecue flavor to the meat; the components are provided with a relative spacing to assure that adequate heat is available at the cooking surface of the grid for usual barbecuing even when electricity is available only from a normal 110—120 volt, 15 amp house circuit.

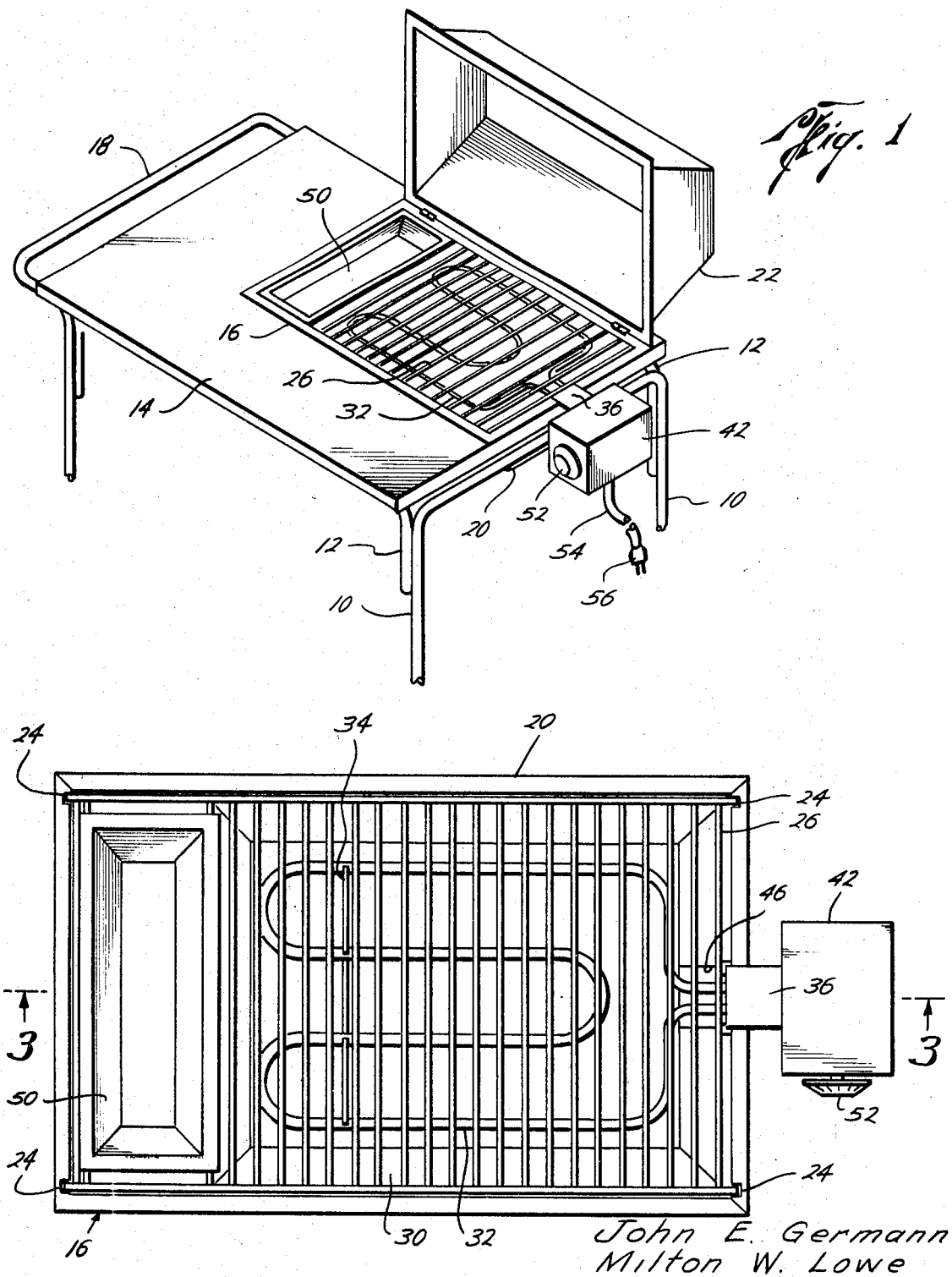

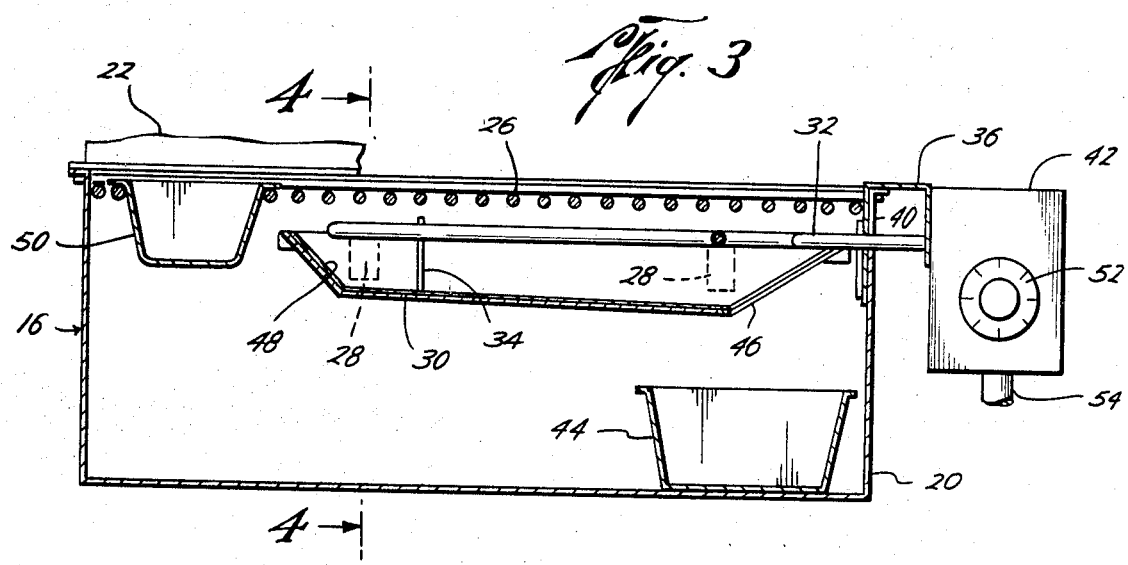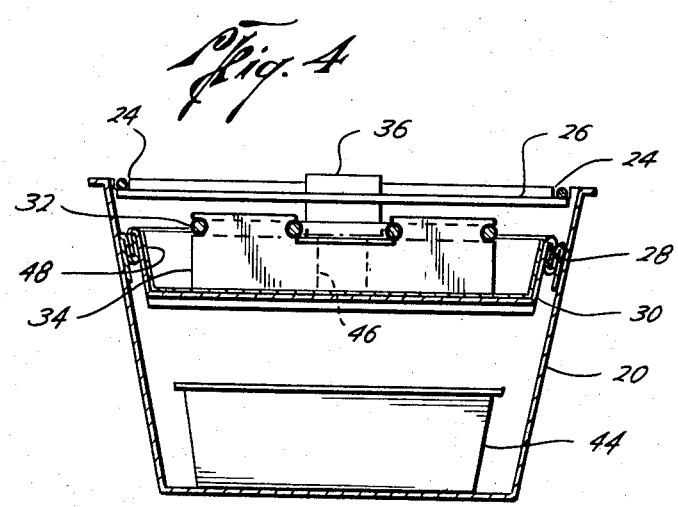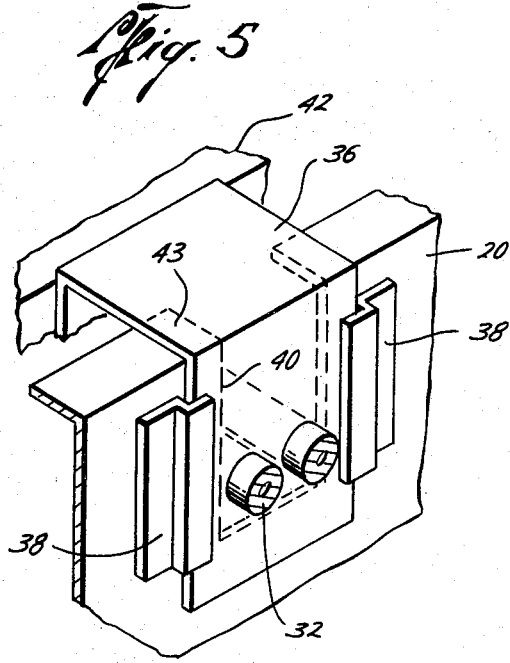

ELECTRIC GRILL

BACKGROUND OF THE INVENTION

In recent years, outdoor barbecue cooking has become quite popular. Much of this cooking is done by charcoal in a portable unit which may be easily stored when not in use. Gas grills have been used for such outdoor cooking. It has been discovered that the distinctive flavor imparted to the food cooked over charcoal results not from the charcoal but rather from the smoke which results from the burning or vaporizing of the grease drippings from the food being cooked. This smoke which is formed below the meat, rises to the cooking surface and permeates the food to provide the distinctive barbecue flavor.

Attempts have been made to provide an electric outdoor grill to eliminate the use of charcoal and because electricity does not require a piping connection such as is required for gas grills. Electric grills which have been suggested require an electricity supply having a potential of 220–240 volts. Such supply is not readily available without special installation in most residences. Outdoor electric grills designed to operate on 110 volt potential electricity are subject to the disadvantages of too slow cooking, non-uniform distribution of heat to the cooking surface, inadequate smoking of the food resulting in loss of the desired distinctive flavor and the collection of meat drippings below the heating coil which gives rise to the danger of ignition of such drippings.

SUMMARY

The present invention relates to an improved cooking grill which may utilize the normally available residential electricity of 110 volts.

It is an object of the present invention to provide an improved cooking grill which is operable on the usual residential electricity supply for barbecue cooking.

A further object is to provide an improved electric grill which assures that only a reasonable portion of drippings are burned or vaporized to smoke.

Another object is to provide an improved grill, which may be portable, having a housing containing a grid, tray and a unitized electric heating coil and control switch which are all readily removable from the housing.

A still further object is to provide an improved electric outdoor cooking grill having provision for the collection and storage of excess grease away from direct exposure from the heating.

Still another object is to provide an improved electric outdoor cooking grill providing adequate and uniform controlled heating for barbecue cooking over a maximum cooking surface.

BRIEF DESCRIPTION OF THE DRAWINGS

These and other objects and advantages are hereinafter set forth with reference to the drawings wherein:

FIG. 1 is a perspective view of an electric barbecue grill constructed in accordance with the present invention;

FIG. 2 is a plan view of the cooking portion of the grill shown in FIG. 1;

FIG. 3 is a sectional view of the grill taken along line 3—3 in FIG. 2;

FIG. 4 is another sectional view taken along line 4—4 in FIG. 3; and

FIG. 5 is an enlarged perspective view of the housing support for the heating coil and its control box.

DESCRIPTION OF THE PREFERRED EMBODIMENT

As shown in FIG. 1, the grill assembly G is supported on the legs 10 which may have wheels (not shown) on their lower ends to render the assembly easy to move. The legs 10 at each end of assembly G are formed from a single tubular member and the horizontal portion of such members cooperates with the braces 12 to provide support for the work surface 14 and the housing 16. If desired, a bar 18 may be connected at one end of the assembly G to provide a handle for moving the assembly G. It should be noted that the housing 16 is located in one corner of the assembly G to provide a maximum area of work surface 14 on two sides of the cooking area.

The housing 16 includes the pan 20 and the cover 22 which is preferably pivotally mounted to the pan 20 so that in its closed or lower position it covers the pan 20 to allow smoking of the food being cooked. Also, it is preferable that the cover 22 be easily removable from the pan 20 so that when it is not to be used, it may be easily removed from the assembly G.

The pan 20 has a bottom and upwardly extending sides and ends and is open at the top as best illustrated in FIGS. 3 and 4. The notches 24 are defined in the upper part of the ends of pan 20. These notches 24 are provided to receive portions of the cooking grid 26 to support the cooking grid 26 in a position spanning the upper open end of the pan 20. The clips 28 are secured to the sides of pan 20 by suitable means, such as, spot welding, to provide support for the tray 30 within the housing pan 20 at a position spaced below the grid 26 as best shown in FIG. 4. Means is provided to removably support the electric heating coil 32 within the housing pan 20 between the cooking grid 26 and the tray 30 with the relative spacing being preselected within the limits as hereinafter set forth. The bracket 34 is connected to the coil 32 and rests on tray 30 to provide support for the outer end of heating coil 32.

The means supporting heating coil 32 includes the U-shaped clip 36 through which the two ends of the heating coil 32 extend and the brackets 38 secured to the inside of housing pan 20 at the sides of slot 40 defined by pan 20. The clip 36 is also secured to the control box 42. Thus, the heating coil 32 is readily installed by sliding the free end of clip 36 into the space defined by the brackets 38. The underside of the clip 36 when installed, rests on the lip 43 of the pan 20 at opposite sides of the slot 40.

The tray 30 is adapted to function as a heat reflector for heating coil 32 and to drain the drippings to the collector pan 44 which is positioned within the housing pan 20 beneath the slot 46 defined in one end of the tray 30. As can be seen in FIG. 3, tray 30 is formed to slope toward slot 46 when installed in pan 20. It is preferred that tray 30 include a disposable liner 48 having the same shape and slope as tray 30. Such liner 48 may be made from aluminum foil. It is used in the tray 30 until it loses its heat reflecting ability and then it is replaced by a new liner 48. If desired, the liner 48 may be omitted, provided the reflecting surfaces of tray 30 are maintained sufficiently bright to perform the desired heat reflecting function. This heat reflection is desirable when the electricity supplied to the heating coil 32 is limited to the usual residential outlet such as 110–120 volts and 15 amps. With such limited power, the heat developed by the heating coil 32 is not normally adequate for the desired barbecue cooking on a maximum cooking area without an effective heat reflecting tray 30.

The cooking grid 26 is shown to provide a space for receiving the sauce pan 50 at one end so that sauce contained therein is readily available to the cooking area for basting. Also, the proximity of the sauce pan 50 to the cooking area keeps the sauce warm.

The control box 42 contains suitable control means for regulating the electric power supplied to the heating coil 32 and such control means is adjusted by the control knob 52. Electric connection to the control box 42 is provided by the flexible cord 54 which includes a plug 56 adapted to engage in an available electric receptacle.

As previously mentioned, barbecue grilling over a maximum grilling area with a limited supply of electrical power is best achieved by controlling the relative spaced relationship of the cooking surface, the heating coil and the reflection surface on the bottom interior of tray 30. The space between the upper surface of the heating coil 32 and the cooking surface defined by the cooking grid 26 is recommended to be within the range of one-fourth to one-half inch and preferably three-eighths of an inch. The average spacing between heating coil and the bottom reflecting surface of tray 30 (or liner 48, if used) is recommended to be within the range from one-half to one and one-half inches and preferably three-fourths of an inch.

The aforementioned spacing has been found to provide sufficient heat at the cooking surface with a limited power supply to provide a uniform and adequate heat for all types of barbecue cooking. The preferred heating coil 32 is a conductor insulated with a heating sheath and having its length adjusted to provide a watt density in the cooking area of approximately eight to eleven watts per square inch. Such heating coil with a configuration as shown in FIG. 2, when supplied with 110-—120 volt, 15 amp electric power, and installed in a grill assembly G having the above recommended spacings, provides uniform and adequate heating for all types of barbecue cooking.

The heating coil 32 is preferred to have a configuration similar to the showing of FIG. 2 or some other configuration in which all of the cooking area is positioned sufficiently close to a portion of the heating coil to assure a uniform heating of the entire cooking area. The coil configuration shown includes four equally spaced straight leg sections joined together by suitable bends to form one continuous heating element.

From the foregoing it can be seen that the present invention provides an electric cooking grill suitable for barbecue cooking to vaporize only a portion of the grease drippings and conduct the grease not vaporized away from the heating coil to prevent excessive burning of such grease. This grill is designed to utilize the usual residential electric outlets having only a 110—120 volt, 15 amp supply for reasonably fast uniform cooking over the entire cooking surface. Such uniform cooking is achieved on the limited power supply by utilizing the desired spacing relationships for the cooking grid, the heating coil and the reflector tray. In such structure, the cooking grid, the heating coil and its control box, and the reflector tray are all easily removed from the housing. Further, the reflector tray may be provided with a replaceable lining to assure that the heat reflection of the tray is maintained at a level sufficient for the desired cooking.

We claim:

1. An electric grill, comprising:

a housing having a bottom and sides and being open at the top;

a reflector tray removably supported within said housing;

an electric heating coil;

means supplying electricity to said heating coil;

a control box containing control means to vary the electricity supplied to said heating coil and being connected to said heating coil;

a U-shaped clip secured to said control box;

means on said housing defining a slot for receiving one end of said clip whereby said control box and said heating coil are supported on said housing with said heating coil positioned above said reflector tray and may be removed as a unit from said housing; and a cooking grid removably supported by said housing across the open top thereof in a position above said heating coil.

2. An electric grill according to claim 1 including:

a bracket connected to said heating coil at a position spaced from said control box and adapted to engage said tray to support said heating coil.

3. An electric grill comprising:

a. a housing having a bottom and sides and being open at the top;

b. a cooking grid, removably supported by said housing adjacent the open top thereof, and having openings therethrough to permit grease from meat being cooked thereon to pass through such grid;

c. a substantially flat reflector tray supported in said housing beneath said cooking grid;

d. an electric heating coil removably supported on said housing, said coil being connected to a voltage source of about 110 to 120 volts and said coil being positioned one-fourth to one-half inch below the upper surface of said cooking grid for vaporizing grease dripped thereon from meat being cooked on said cooking grid without such grease igniting;

e. said reflector tray being positioned one-half inch to one and one-half inches below said heating coil for reflecting heat therefrom to broil the meat on said cooking surface and to prevent such grease which reaches said tray from igniting, and said reflecting tray having means for directing grease dripping past said heating coil away from such coil; and f. means for effecting a removal of such grease from said reflector tray.